US012754507B2

(12) United States Patent
Imoto et al.

(10) Patent No.: US 12,754,507 B2
(45) Date of Patent: Oct. 6, 2026

(54) IMAGE FORMING APPARATUS

(71) Applicant: Konica Minolta, Inc., Tokyo (JP)

(72) Inventors: Tomiko Imoto, Toyohashi (JP); Keiko Yasuda, Toyohashi (JP); Takeru Kinoshita, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 19/023,788

(22) Filed: Jan. 16, 2025

(65) Prior Publication Data

US 2025/0251690 A1 Aug. 7, 2025

(30) Foreign Application Priority Data

Feb. 7, 2024 (JP) ................................ 2024-016998

(51) Int. Cl.
*G03G 15/01* (2006.01)
*G03G 15/00* (2006.01)
*G03G 21/16* (2006.01)

(52) U.S. Cl.
CPC ....... *G03G 15/657* (2013.01); *G03G 15/0131* (2013.01); *G03G 15/0189* (2013.01); *G03G 21/1638* (2013.01)

(58) Field of Classification Search
CPC . G03G 21/1647; G03G 21/168; G03G 15/161
See application file for complete search history.

(56) References Cited

U.S. PATENT DOCUMENTS

2010/0166455 A1* 7/2010 Mori .................... G03G 21/168 399/113
2011/0064449 A1* 3/2011 Shimizu ............. G03G 15/2017 399/92
2013/0266336 A1* 10/2013 Maeda ............... G03G 15/1605 399/121
2014/0010575 A1* 1/2014 Sakuma ............. G03G 21/1647 399/121
2015/0307307 A1* 10/2015 Goto .................. G03G 21/1633 399/13
2021/0405557 A1* 12/2021 Imaizumi ........... G03G 15/1615

FOREIGN PATENT DOCUMENTS

JP 6358218 B2 7/2018

* cited by examiner

*Primary Examiner* — Jessica L Eley
(74) *Attorney, Agent, or Firm* — LUCAS & MERCANTI, LLP

(57) ABSTRACT

An image forming apparatus includes a photoreceptor that bears a toner image, an intermediate transfer unit that receives the toner image from the photoreceptor and bears the toner image, a transfer section that transfers the toner image borne by the intermediate transfer unit to a recording medium, a fixing section that fixes the toner image to the recording medium, and a conveyance guide that is provided between the transfer section and the fixing section, and guides the recording medium to be conveyed from the transfer section toward the fixing section, wherein the intermediate transfer unit is attachable to and detachable from an apparatus body, and during attachment or detachment of the intermediate transfer unit, the conveyance guide is retractable to a retracted position where the conveyance guide does not interfere with attachment or detachment of the intermediate transfer unit.

11 Claims, 12 Drawing Sheets

IMAGE FORMING APPARATUS

CROSS-REFERENCE TO RELATED APPLICATIONS

The entire invention of Japanese patent Application No. 2024-016998 filed on Feb. 7, 2024, is incorporated herein by reference in its entirety.

BACKGROUND OF THE INVENTION

Technical Field

The present invention relates to an image forming apparatus. In particular, the present invention relates to an image forming apparatus including an image bearing member that bears a toner image.

Description of Related art

Conventionally, an image forming apparatus that forms an image using toner in a plurality of colors is known. For example, Japanese Patent No. 6358218 describes an image forming apparatus, that includes an image bearing member disposed in an apparatus main body of the image forming apparatus, wherein an intermediate transfer unit includes an intermediate transfer belt that is formed as an endless belt and onto which a toner image formed on the image bearing member is transferred, and a driving roller and a driven roller that rotatably stretch the intermediate transfer belt, the intermediate transfer unit being insertable/drawable with respect to the apparatus main body in a direction in which the intermediate transfer belt is stretched by the driving roller and the driven roller, a secondary transfer roller disposed on a downstream side of the intermediate transfer unit in a drawing direction in which the intermediate transfer unit is drawable with respect to the apparatus main body, the secondary transfer roller constituting a nip portion together with the intermediate transfer belt by abutting on an outer circumferential surface of the intermediate transfer belt, and a fixing unit that is disposed above the intermediate transfer unit, that fixes on a recording medium a toner image transferred from the intermediate transfer belt onto the recording medium, and that is insertable/drawable with respect to the apparatus main body in a direction same as a direction in which the intermediate transfer unit is insertable/drawable with respect to the apparatus main body, and the intermediate transfer unit includes an entry restriction member that is disposed on a downstream side with respect to the nip portion in a recording medium conveyance direction, and that restricts entry of the recording medium into a space between the intermediate transfer unit and the fixing unit after passing through the nip portion.

In the image forming apparatus described in Japanese Patent No. 6358218, when the intermediate transfer unit is inserted and drawn, it is necessary to move the intermediate transfer unit upwardly in order to separate the intermediate transfer unit from the image bearing member and then draw the intermediate transfer unit from the apparatus. Because being provided between the intermediate transfer unit and the fixing unit, the entry restriction member interferes with the intermediate transfer unit or the fixing unit when the intermediate transfer unit is inserted or drawn. Therefore, it is necessary to take out the entry restriction member or the fixing device before the intermediate transfer unit is inserted or drawn, which is a burden on a worker. Further, there is a problem that, after the intermediate transfer unit is attached, the worker may forget to attach the entry restriction member.

SUMMARY OF THE INVENTION

An image forming apparatus according to one aspect of the present invention includes a photoreceptor that bears a toner image, an intermediate transfer unit that receives the toner image from the photoreceptor and bears the toner image, a transfer section that transfers the toner image borne by the intermediate transfer unit to a recording medium, a fixing section that fixes the toner image to the recording medium, and a conveyance guide that is provided between the transfer section and the fixing section, and guides the recording medium to be conveyed from the transfer section toward the fixing section, wherein the intermediate transfer unit is attachable to and detachable from an apparatus body, and during attachment or detachment of the intermediate transfer unit, the conveyance guide is retractable to a retracted position where the conveyance guide does not interfere with attachment or detachment of the intermediate transfer unit.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
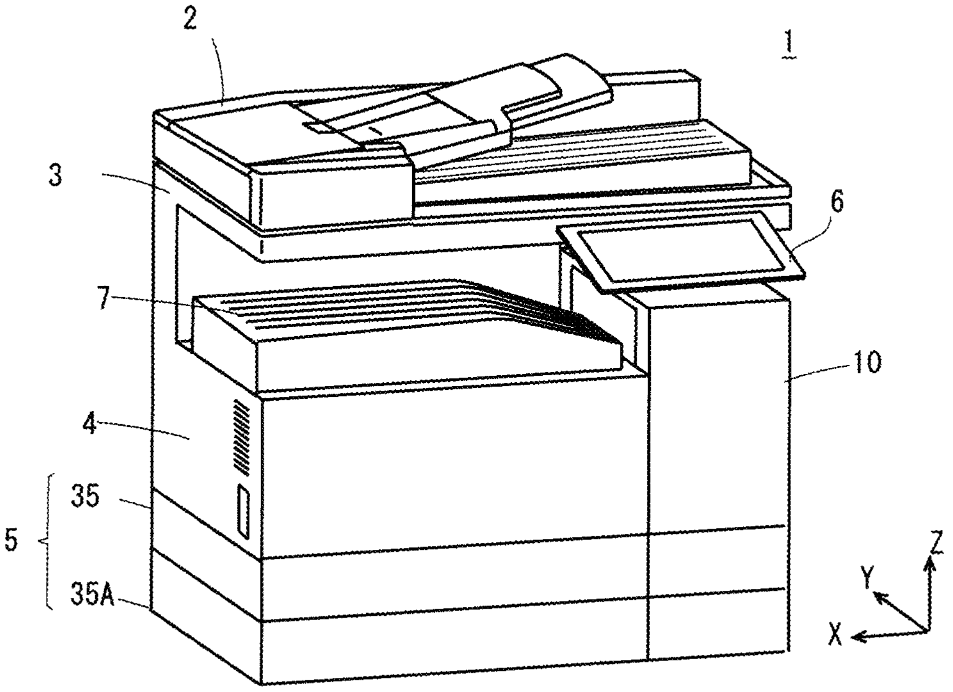
FIG. 1 is a perspective view illustrating the appearance of an image forming apparatus in the present embodiment.

Hereinafter, one or more embodiments of the present invention will be described with reference to the drawings. However, the scope of the invention is not limited to the disclosed embodiments.

An image forming apparatus in embodiments of the present invention will be described below with reference to the drawings. In the following description, the same components are denoted by the same reference numerals.

Their names and functions are also the same. Therefore, a detailed description thereof will not be repeated.

First Embodiment

FIG. 1 is a perspective view illustrating the appearance of an image forming apparatus in the present embodiment. With reference to FIG. 1, the image forming apparatus 1 includes an automatic document conveyance apparatus 2, a document reading section 3, an image forming section 4, a sheet feed section 5 and an operation panel 6. The automatic document conveyance apparatus 2 automatically conveys a plurality of documents set on a document tray to a document reading position of the document reading section 3 one by one, and discharges a document having an image formed thereon and read by the document reading section 3 to a document ejection tray.

The document reading section 3 optically reads a document that has been conveyed to the document reading position by the automatic document conveyance apparatus 2. The document reading section 3 outputs image data which is obtained when a document is optically read to the image forming section 4.

The sheet feed section 5 includes two sheet feed cassettes 35, 35A for accommodating sheets. The sheet feed section 5 conveys a sheet accommodated in one of the two sheet feed cassettes 35, 35A to the image forming section 4. The image forming section 4 forms an image using a well-known electrophotographic method, forms an image on a sheet conveyed by the sheet feed section 5 based on image data, and discharges the sheet having an image formed thereon to a sheet ejection tray 7.

The operation panel 6 includes a display device and an operation part, and receives an input operation performed by a user. The image forming apparatus 1 works in accordance with an operation input to the operation panel 6.

Figure 2:
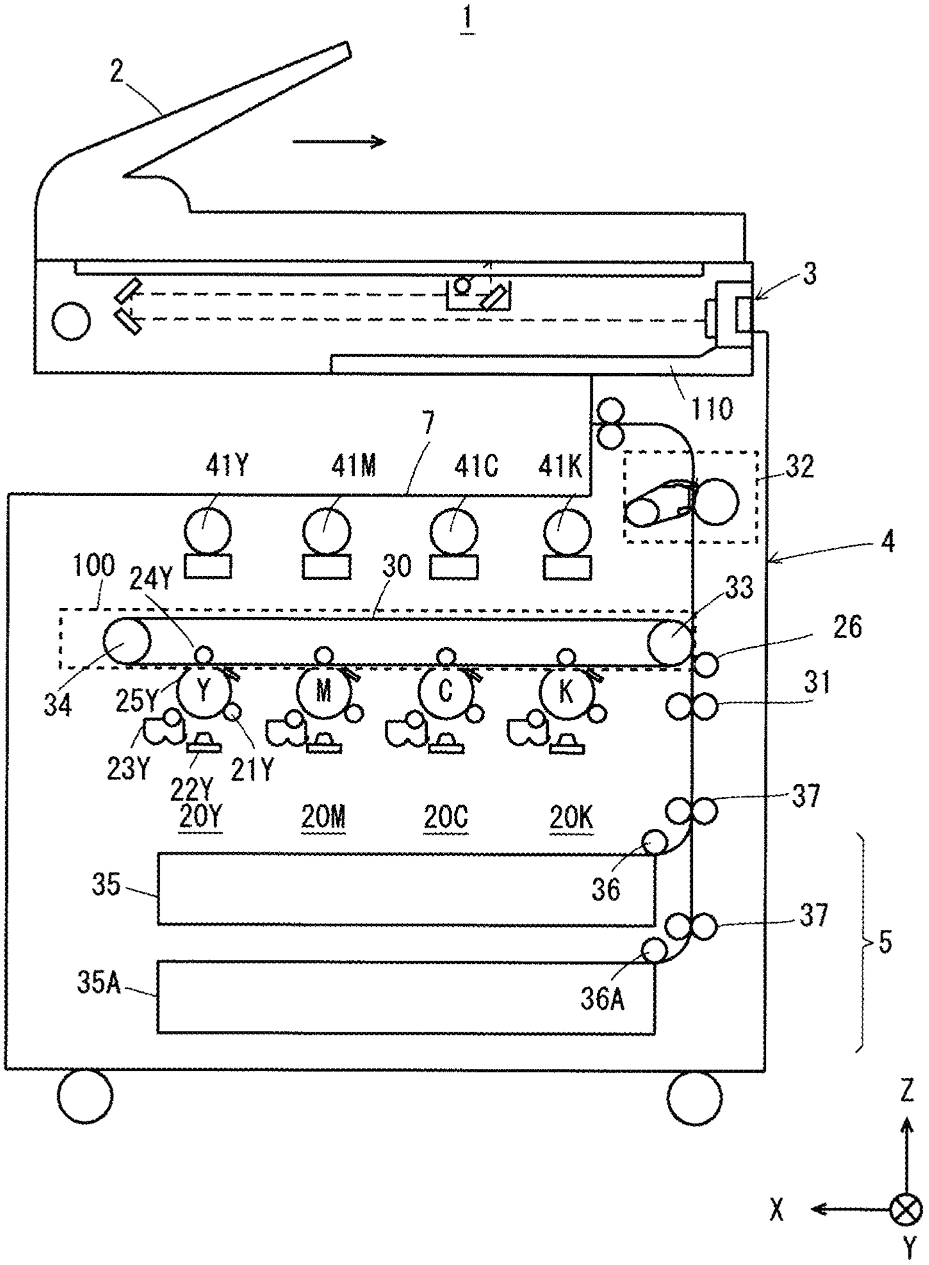
FIG. 2 is a schematic cross-sectional view illustrating one example of the inner configuration of the image forming apparatus.

FIG. 2 is a schematic cross-sectional view illustrating one example of the inner configuration of the image forming apparatus. FIG. 2 illustrates the cross section of the image forming apparatus as viewed from the front. An X direction, a Y direction and a Z direction orthogonal to one another are defined. The X direction and the Y direction are parallel to a horizontal plane. In the following description, the X direction is a direction parallel to the left and right of the image forming apparatus 1, and is also referred to as a leftward-and-rightward direction. The Y direction is a direction parallel to a depth direction of the image forming apparatus 1, and is also referred to as a forward-and-rearward direction. The Z direction is a direction parallel to an upward-and-downward direction of the image forming apparatus 1 and is also referred to as an upward-and-downward direction. In the image forming apparatus 1, a main scanning direction is parallel to the Y direction, and a sub-scanning direction is parallel to the X direction.

With reference to FIG. 2, the image forming section 4 includes image forming units 20Y, 20M, 20C, 20K, a transfer unit 100, a secondary transfer roller 26 and a fixing device 32. The image forming units 20Y, 20M, 20C, 20K correspond to yellow, magenta, cyan and black, respectively. Here, "Y," "M," "C" and "K" represent yellow, magenta, cyan and black, respectively. An image is formed by driving of at least one of the image forming units 20Y, 20M, 20C, 20K. When all of the image forming units 20Y, 20M, 20C, 20K are driven, a full-color image is formed. Printing data pieces for yellow, magenta, cyan and black are respectively input to the image forming units 20Y, 20M, 20C, 20K. The only difference among the image forming units 20Y, 20M, 20C, 20K is the colors of toners used by the image forming units 20Y, 20M, 20C, 20K. Therefore, the image forming unit 20Y for forming an image in yellow will be described here.

The image forming unit 20Y includes a charging roller 21Y, an exposure device 22Y, a developing device 23Y, a primary transfer roller 24Y, a photoreceptor 25Y which is an image bearing member, and a toner bottle 41Y. The toner bottle 41Y accommodates a yellow toner. The toner bottle 41Y rotates with a toner bottle motor used as a drive source and discharges a developer to the outside. The toner discharged from the toner bottle 41Y is supplied to the developing device 23Y.

The photoreceptor 25Y is a cylindrical drum, and is rotatable about a rotationally symmetric axis. Around the photoreceptor 25Y, the charging roller 21Y, the exposure device 22Y, the developing device 23Y and the primary transfer roller 24Y are arranged in this order in the rotation direction of the photoreceptor 25Y.

The surface of the photoreceptor 25Y is charged by the charging roller 21Y and then irradiated with a laser beam emitted by the exposure device 22Y. The exposure device 22Y forms an electrostatic latent image by exposing the portion corresponding to an image on the surface of the photoreceptor 25Y. Thus, an electrostatic latent image is formed on the photoreceptor 25Y. Subsequently, the developing device 23Y develops the electrostatic latent image formed on the photoreceptor 25Y with the toner. Specifically, the toner held by a developing roller of the developing device 23Y is placed on the electrostatic latent image formed on the photoreceptor 25Y by the effect of an electric field force, so that a toner image is formed on the photoreceptor 25Y. The toner image formed on the photoreceptor 25Y is transferred by the primary transfer roller 24Y onto a transfer belt 30, serving as an image bearing member, by the effect of an electric field force.

The transfer unit 100 includes a transfer belt 30, a driving roller 33 and a driven roller 34. The transfer belt 30 is suspended by the driving roller 33 and the driven roller 34 so as not to loosen. When the driving roller 33 rotates in a clockwise direction in the diagram, the intermediate transfer belt 30 rotates in the clockwise direction in the diagram at a predetermined speed. The driven roller 34 rotates in a counterclockwise direction in accordance with rotation of the transfer belt 30. Thus, the image forming units 20Y, 20M, 20C, 20K transfer toner images onto the transfer belt 30 in this order. Timing for transferring toner images onto the transfer belt 30 by the respective image forming units 20Y, 20M, 20C, 20K is adjusted by detection of a reference mark provided on the transfer belt 30. Thus, toner images in yellow, magenta, cyan and black are superimposed on the transfer belt 30.

When forming a full-color image, the image forming apparatus 1 drives all of the image forming units 20Y, 20M, 20C, 20K. Thus, toner images in yellow, magenta, cyan and black are superimposed on the transfer belt 30. When forming a monochrome image, the image forming apparatus 1 drives any one of the image forming units 20Y, 20M, 20C, 20K. It is also possible to form an image by combining two or more of the image forming units 20Y, 20M, 20C, 20K.

In the sheet feed cassettes 35, 35A, sheets in different sizes are respectively set. The sheets respectively accommodated in the sheet feed cassettes 35, 35A are supplied to a conveyance path by pickup rollers 36, 36A respectively attached to the sheet feed cassettes 35, 35A and are sent to a timing roller 31 by a sheet feed roller 37.

The timing roller 31 conveys a sheet conveyed by the sheet feed roller 37 to a nip portion between the transfer belt 30 and the secondary transfer roller 26 serving as a transfer member. The secondary transfer roller 26 generates an electric field in the nip portion. In this nip portion, due to the effect of an electric field force, a toner image that has been formed on the transfer belt 30 is transferred onto a sheet conveyed by the timing roller 31. A sheet to which toner images are transferred is conveyed to a fixing device 32 to be heated and pressurized by the fixing device 32. Thus, the toner is fused and fixed to the sheet. Thereafter, the sheet is discharged to the sheet ejection tray 7.

Figure 3:
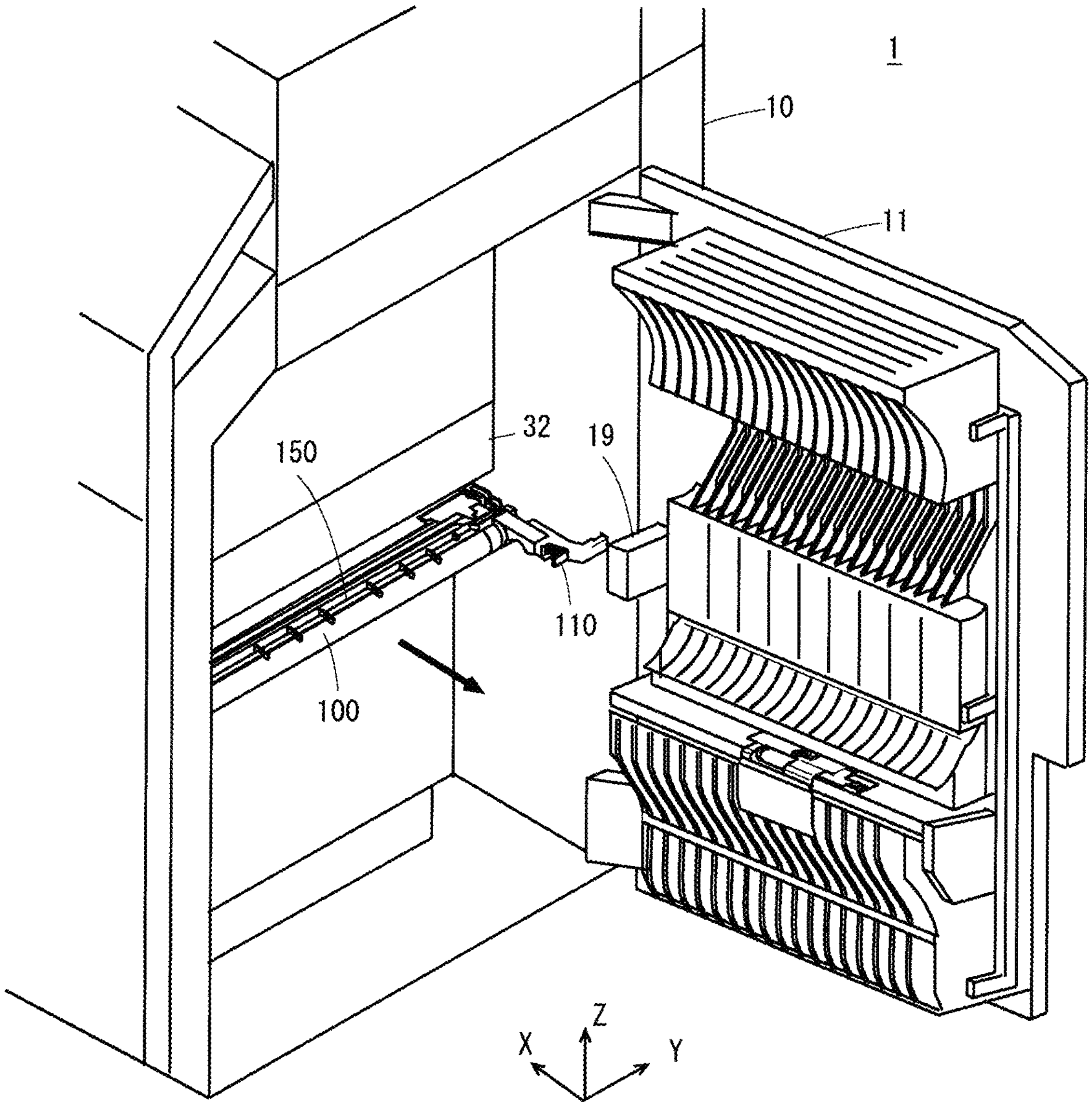
FIG. 3 is a perspective view of the image forming apparatus with a door opened.

FIG. 3 is a perspective view of the image forming apparatus with a door opened. With reference to FIG. 3, a housing 10 of the image forming apparatus 1 has a door 11 at the left side surface of the housing 10. The door 11 is openable and closable. The housing 10 has an accommodation space for accommodating the image forming section 4 and the sheet feed section 5. In an open state in which the door 11 is opened, the accommodation space of the housing 10 is opened outwardly. In a close state in which the door 11 is closed, the accommodation space of the housing 10 is not opened outwardly. The inner surface of the door 11 close to the accommodation space forms one surface of the conveyance path through which a sheet passes.

In the open state in which the door 11 of the housing 10 is opened, the end portion of each of the transfer unit 100 and the fixing device 32 in a negative X direction is exposed. Therefore, the user can access the transfer unit 100. A conveyance guide 150 is arranged between the transfer unit 100 and the fixing device 32. The conveyance guide 150 is fixed to the transfer unit 100. The transfer unit 100 can be detached from the housing 10 by being pulled out in the negative X direction indicated by the arrow in the diagram.

Figure 4:
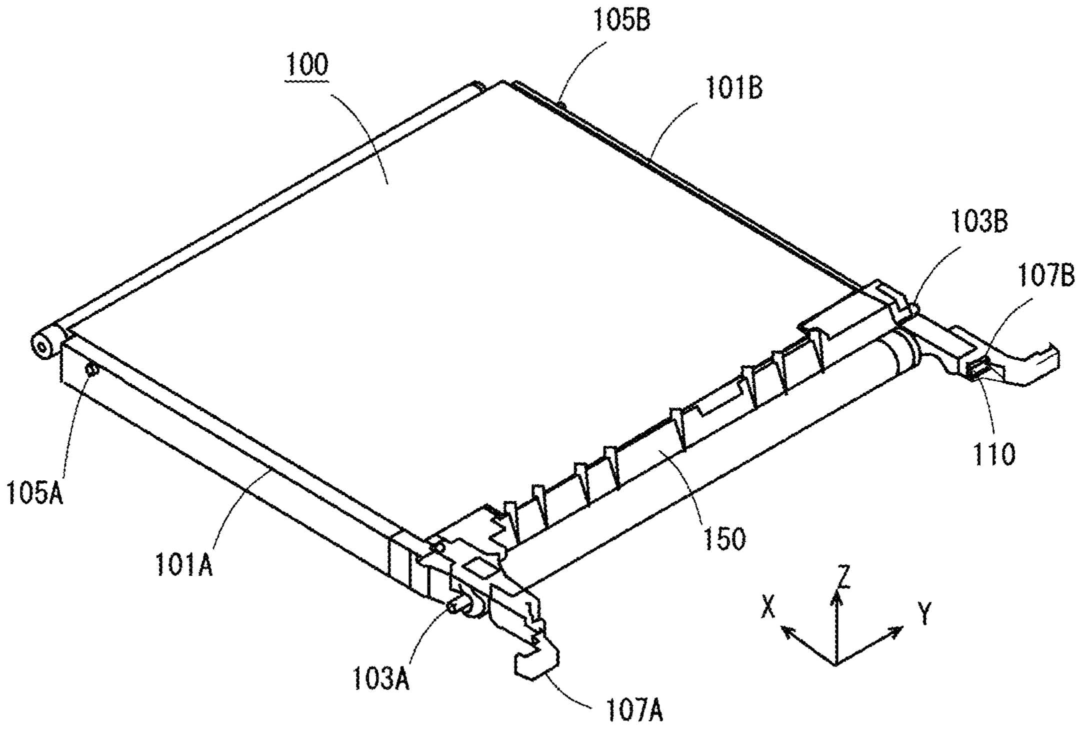
FIG. 4 is a perspective view of a transfer unit.
Figure 5:
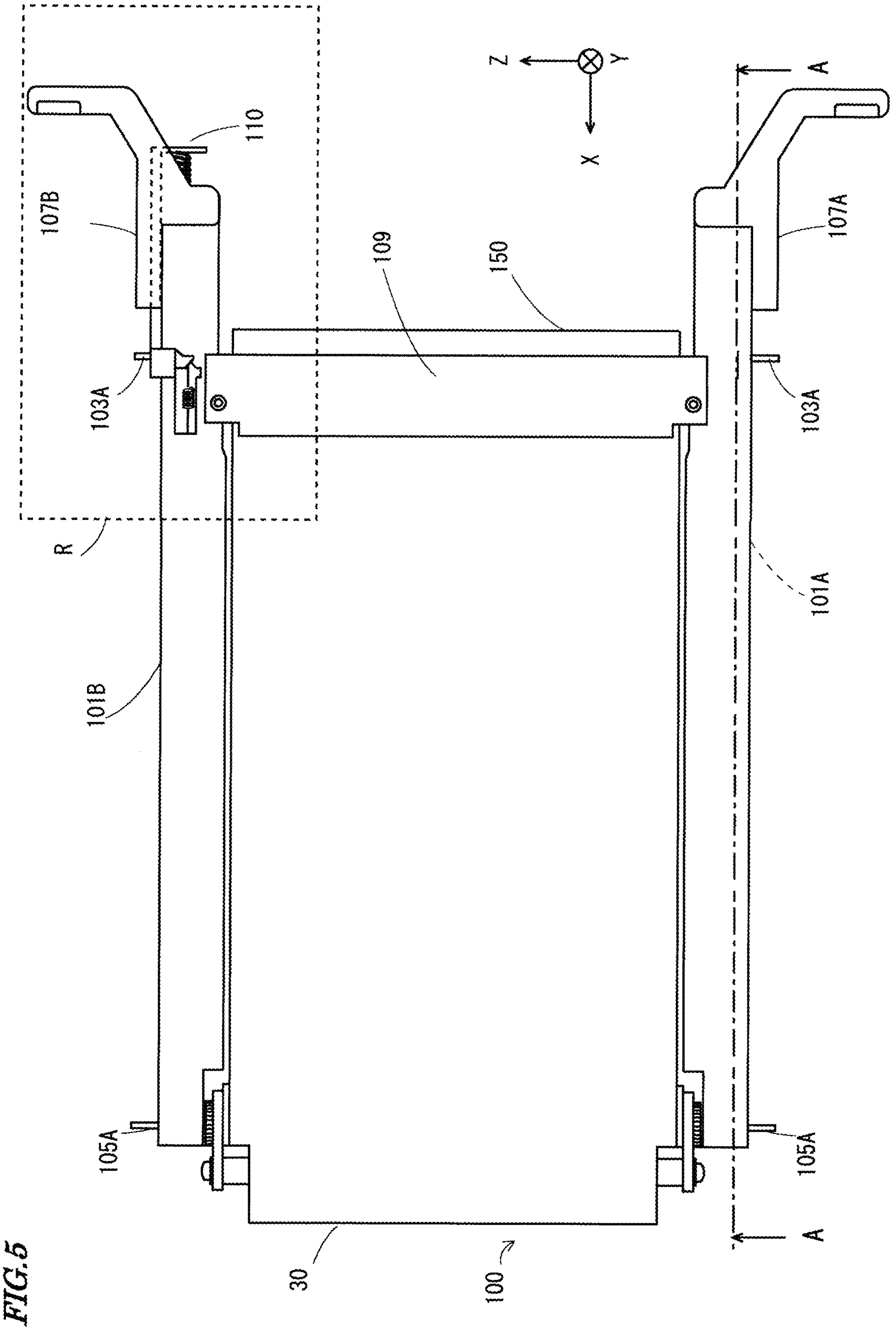
FIG. 5 is a plan view of the transfer unit.
Figure 6:
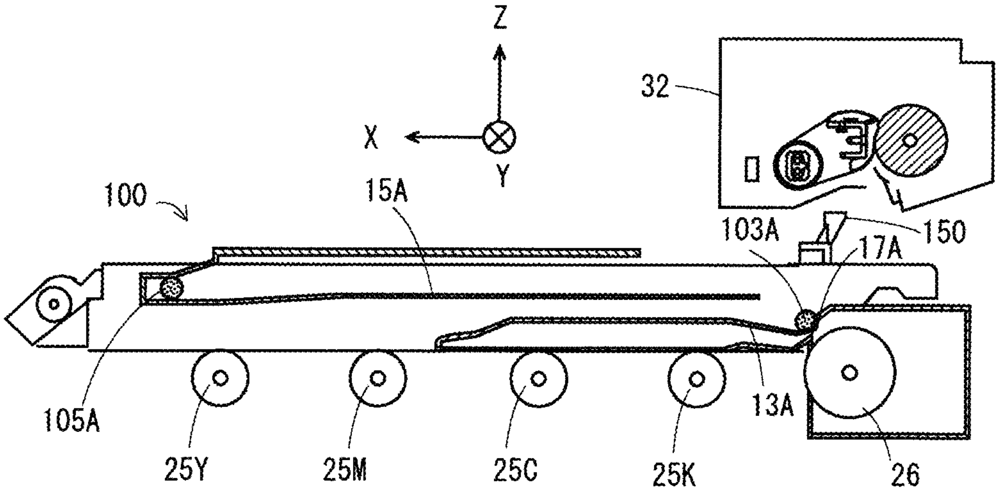
FIG. 6 is a first diagram illustrating the cross section taken along the line A-A of FIG. 5.

FIG. 4 is a perspective view of the transfer unit. FIG. 5 is a plan view of the transfer unit. The conveyance guide 150 is not illustrated in FIG. 5. FIG. 6 is a first diagram illustrating the cross section taken along the line A-A of FIG. 5. With reference to FIGS. 4 to 6, the transfer unit 100 includes a front frame 101A and a rear frame 101B. The front frame 101A and the rear frame 101B are opposite to each other and are arranged to be spaced from each other by a predetermined distance in the Y direction. The driving roller 33 and the driven roller 34 are arranged between the front frame 101A and the rear frame 101B. Each of the front frame 101A and the rear frame 101B includes a bearing that pivotally supports the rotation shaft of the driving roller 33 and the driven roller 34.

The front frame 101A has a first front guide pin 103A and a second front guide pin 105A that project in a direction parallel to the Y direction from the surface opposite to the surface facing the rear frame 101B. The first front guide pin 103A and the second front guide pin 105A are arranged to be spaced apart from each other by a predetermined distance in the X direction. The rear frame 101B has a first rear guide pin 103B and a second rear guide pin 105B that project in a direction parallel to the Y direction from the surface opposite to the surface facing the front frame 101A. The first rear guide pin 103B and the second rear guide pin 105B are arranged to be spaced apart from each other by a predetermined distance in the X direction.

A positioning plate 109 has a flat-plate shape, and both ends thereof are respectively fixed to the upper surface of the front frame 101A and the upper surface of the rear frame 101B. The positioning plate 109 are positioned above the transfer belt 30 at the respective end portions of the front frame 101A and the rear frame 101B in the negative X direction.

A front handle 107A is provided at the end portion of the front frame 101A in the negative X direction. rear handle 107B is provided at the end portion of the rear frame 101B in the negative X direction. Each of the front handle 107A and the rear handle 107B has a size and a shape that enable the user to grip each of the front handle 107A and the rear handle 107B. The user can grip the front handle 107A and the rear handle 107B with both hands. This facilitates the user's work for attaching the transfer unit 100 to the housing 10 or detaching the transfer unit 100 from the housing 10. Specifically, the user can easily work to move the transfer unit 100 in the upward-and-downward direction, move the transfer unit 100 in the horizontal direction and rotate the transfer unit 100 in the horizontal direction.

The transfer unit 100 is attached to or detached from the housing 10 by sliding in a direction parallel to the X direction in the housing 10. As illustrated in FIG. 6, the transfer unit 100 is supported by the housing 10 at both ends in the Y direction and is fixed to the housing 10. Because the same configuration with which the transfer unit 100 is supported and fixed by the housing 10 is provided at each of both ends in the Y direction, the configuration at the front end of the transfer unit 100 is described below by way of example.

A first front guide 13A is fixed to the inner side of the front wall of the housing 10. Further, a second front guide 15A is fixed to the inner side of the rear wall of the housing 10. Each of the first front guide 13A and the second front guide 15A is a plate extending in the X direction. The first front guide 13A has a restriction surface 17A that extends in the Z direction and is directed in the positive X direction.

In a case in which the transfer unit 100 is located at a receiving position, in the transfer unit 100, the first front guide pin 103A fixed to the front frame 101A is supported by the first front guide 13A, and the second front guide pin 105A fixed to the front frame 101A is supported by the second front guide 15A. Further, the first front guide pin 103A is restricted by the restriction surface 17A from moving in the negative X direction while being supported by the first front guide 13A.

When the user attaches the transfer unit 100 to or detaches the transfer unit 100 from the housing 10, the first front guide pin 103A needs to be located farther upwardly than the restriction surface 17A.

On the other hand, the conveyance guide 150 is fixed to the transfer unit 100. The conveyance guide 150 is located between the secondary transfer roller 26 and the fixing device 32. In the present embodiment, the conveyance guide 150 is located between the transfer unit 100 and the fixing device 32. Therefore, in a case in which the relative positions of the transfer unit 100 and the conveyance guide 150 have the positional relationship illustrated in FIG. 6, the transfer unit 100 cannot be moved upwardly without abutment of the conveyance guide 150 against the fixing device 32. The position of the conveyance guide 150 with the relative positions of the transfer unit 100 and the conveyance guide 150 having the positional relationship illustrated in FIG. 6 is referred to as a guide position.

When the transfer unit 100 is attached to or detached from the housing 10, the image forming apparatus 1 in the present embodiment retracts the conveyance guide 150 to a retracted position where the conveyance guide 150 does not interfere with attachment or detachment of the transfer unit 100. Details of the configuration for moving the conveyance guide 150 from the guide position to the retracted position will be described below.

Figure 7:
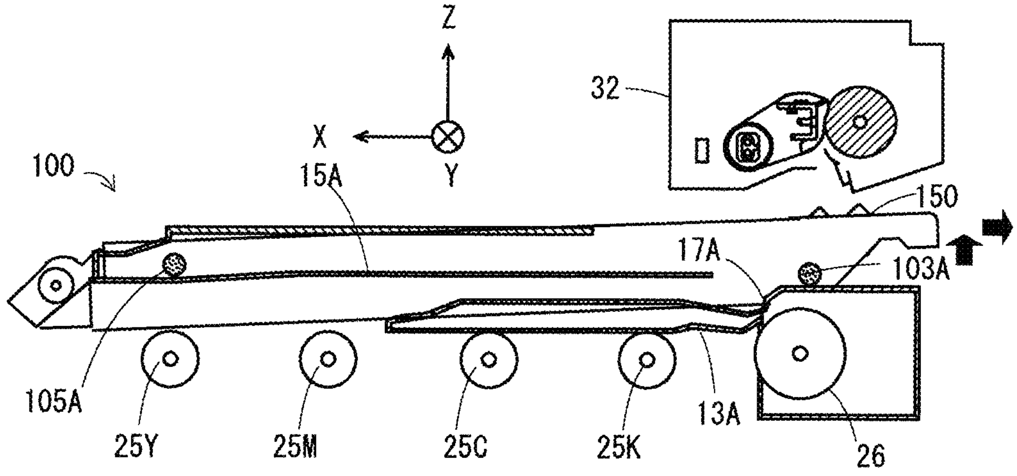
FIG. 7 is a second diagram illustrating the cross section taken along the line A-A of FIG. 5.

FIG. 7 is a second diagram illustrating the cross section taken along the line A-A of FIG. 5. FIG. 7 illustrates the transfer unit 100 with the conveyance guide 150 having moved from the guide position to the retracted position. A space between the transfer unit 100 and the fixing device 32 is ensured. Here, the user's work for attaching the transfer unit 100 to or detaching the transfer unit 100 from the housing 10 after the conveyance guide 150 has moved from the guide position to the retracted position will be described.

When attaching the transfer unit 100 to the housing 10, the user first places the second front guide pins 105A of the transfer unit 100 on the second front guide 15A. In this state, when the user pushes the transfer unit 100 in the positive X direction, the second front guide pin 105A slides on the second front guide 15A. Next, with the first front guide pin 103A located on the first front guide 13A, the user places the first front guide pin 103A on the first front guide 13A. At this stage, in the transfer unit 100, the positions in the upward-and-downward direction of the first front guide pin 103A and the first rear guide pin 103B opposite to the first front guide pin 103A, and the second front guide pin 105A and the second rear guide pin 105B opposite to the second front guide pin 105A, are defined.

In regard to the first front guide 13A, a first portion located at a position farther negative than the restriction surface 17A in the X direction and a second portion located at a position farther positive than the restriction surface 17A in the X direction have different heights. The first portion is located farther upwardly than the second portion. The height of the second portion is a height that causes the distance between the transfer belt 30 of the transfer unit 100 and each of the photoreceptors 25Y, 25M, 25C, 25K to be a predetermined distance. Therefore, at the stage where the first front guide pin 103A is located on the first portion, the distance between the transfer unit 100 and each of the photoreceptors 25Y, 25M, 25C, 25K is larger than the predetermined distance. Therefore, in a period during which the first front guide pin 103A slides on the first portion, it is possible to prevent the transfer belt 30 from abutting against the photoreceptors 25Y, 25M, 25C, 25K and damaging the photoreceptors 25Y, 25M, 25C, 25K and the transfer belt 30.

Further, when the user pushes the transfer unit 100 in the positive X direction, the first front guide pin 103A moves to a position farther positive than the restriction surface 17A in the X direction. When the first front guide pin 103A moves to a position farther positive than the restriction surface 17A in the X direction, the height of the first front guide pin 103A is defined by the second portion of the first front guide 13A. Thus, the distance between the transfer unit 100 and each of the photoreceptors 25Y, 25M, 25C, 25K is adjusted to the predetermined distance.

An elastic member that biases the transfer unit 100 in the negative X direction is provided at the inner surface of the right sidewall of the housing 10. When the user releases his or her hand from the transfer unit 100 after the first front guide pin 103A moves to a position farther positive than the restriction surface 17A in the X direction, the first front guide pin 103A abuts against the restriction surface 17A, and the transfer unit 100 is positioned at the receiving position. With the first front guide pin 103A positioned at the restriction surface 17A, the attachment work for attaching the transfer unit 100 to the housing 10 is completed. In this state, the transfer belt 30 of the transfer unit 100 comes into contact with the secondary transfer roller 26 at a position farther negative than the transfer unit 100 in the X direction and obliquely below the transfer unit 100, and the distance between the transfer belt 30 and each of the photoreceptors 25Y, 25M, 25C, 25K is the predetermined distance.

When detaching the transfer unit 100 from the housing 10, the user first moves the transfer unit 100 upwardly to a separation position at which the first front guide pin 103A is farther upward than the restriction surface 17A. Because being biased in the negative X direction, the transfer unit 100 moves in the negative X direction. The positional relationship between the transfer unit 100 and housing 10 at this stage is illustrated in FIG. 7.

Because the first front guide pin 103A does not abut against the restriction surface 17A, the transfer unit 100 is movable in the negative X direction. When the user moves the transfer unit 100 in the negative X direction, the first front guide pin 103A slides on the first front guide 13A, and the second front guide pin 105A slides on the second front guide 15A. In the stage where the first front guide pin 103A is located on the first portion, the distance between the transfer unit 100 and each of the photoreceptors 25Y, 25M, 25C, 25K is larger than the predetermined distance. Therefore, in a period during which the first front guide pin 103A slides on the first portion, it is possible to prevent the transfer belt 30 from abutting against the photoreceptors 25Y, 25M, 25C, 25K and damaging the photoreceptors 25Y, 25M, 25C, 25K and the transfer belt 30.

Further, when the user moves the transfer unit 100 in the negative X direction, the first front guide pin 103A moves to a position farther negative than the first front guide 13A in the X direction, and the second front guide pin 105A slides on the second front guide 15A. Thereafter, the user can take out the transfer unit 100 from the housing 10.

Figure 8:
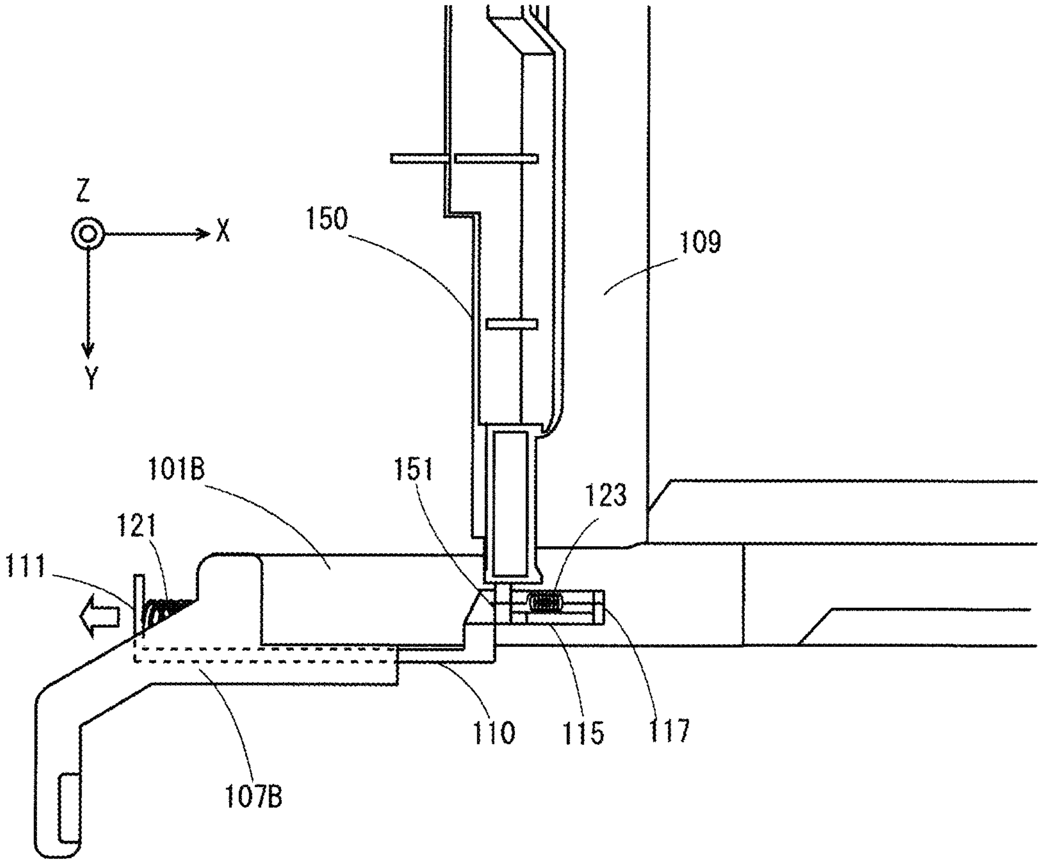
FIG. 8 is a diagram illustrating an area R of FIG. 5 in an enlarged manner.

Next, the configuration for moving the conveyance guide 150 between the guide position and the retracted position will be described. FIG. 8 is a diagram illustrating an area R of FIG. 5 in an enlarged manner. With reference to FIG. 8, a slider 110 is arranged between the rear handle 107B and the rear frame 101B. A hole that penetrates in the X direction is formed in the rear handle 107B, and the slider 110 is arranged in the clearance between the rear handle 107B and the rear frame 101B through the hole. The clearance between the rear handle 107B and the rear frame 101B has a shape extending in the X direction. Because the slider 110 is interposed between the rear handle 107B and the rear frame 101B, the movement in the Y direction is restricted.

Figure 9:
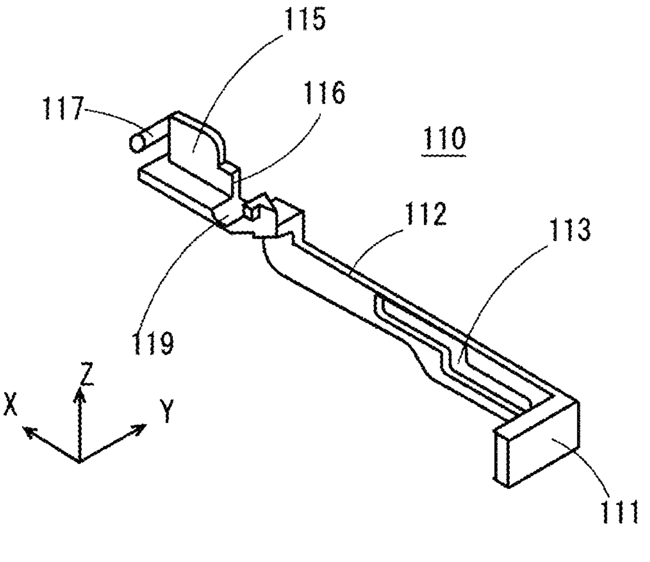
FIG. 9 is a perspective view of a slider.

FIG. 9 is a perspective view of the slider. With reference to FIG. 9, the slider 110 includes a pressed plate 111, a slide plate 112, a guide plate 115, a locking portion 117 and an engaging portion 119. The slide plate 112 has two surfaces facing opposite to each other and has a flat-plate shape extending in the X direction. Each of the two surfaces extends orthogonally to the Y direction. A guide groove 113 is formed in the slide plate 112. The guide groove 113 includes a first groove and a second groove parallel to the X direction. The first groove and the second groove partially overlap with each other in the X direction, and are formed in the slide plate 112 to be spaced apart from each other by a predetermined distance in the Z direction.

The end portion of the slide plate 112 in the negative X direction is connected to the pressed plate 111. The pressed plate 111 intersects with the both surfaces of the slide plate 112. The end portion of the slide plate 112 in the positive X direction is connected to the guide plate 115. The pressed plate 111 has a pressed surface that is orthogonal to the X direction and faces in the negative X direction.

The end portion of the slide plate 112 in the positive X direction is connected to the guide plate 115 and the engaging portion 119. The guide plate 115 has a guide surface 116 facing in the negative X direction. The locking portion 117 is fixed to the end portion of the guide plate 115 opposite to the guide surface 116. The locking portion 117 has a cylindrical shape extending in the Y direction. The locking portion 117 projects to a position farther negative than the guide plate 115 in the Y direction. The engaging portion 119 is arranged to be adjacent to the end portion of the guide plate 115 in the negative X direction. The engaging portion 119 is a groove extending in the Y direction and has an engaging surface connected to the lower end of the guide surface 116. The engaging surface has a curved shape in which the cross section taken along the plane orthogonal to the Y direction projects downwardly.

Figure 10:
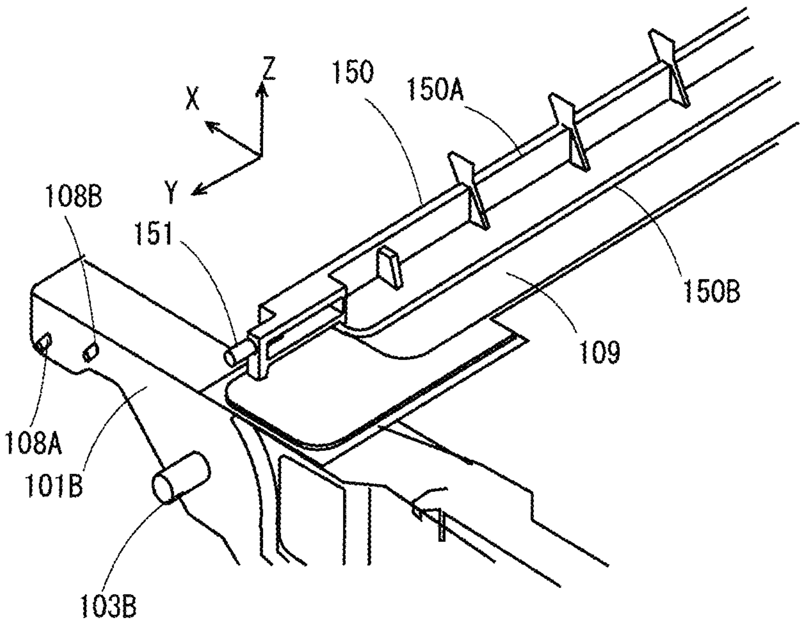
FIG. 10 is a perspective view of a conveyance guide.

FIG. 10 is a perspective view of the conveyance guide. With reference to FIG. 10, the conveyance guide 150 has a slide projection 151 at the end portion in the positive Y direction. Similarly, the conveyance guide 150 has a slide projection 151 at the end portion in the negative Y direction. Each of the two slide projections 151 respectively formed at both ends of the conveyance guide 150 in the Y direction has a cylindrical shape, and the rotationally symmetric axis is parallel to the Y direction. The rotation axes of the two slide projections 151 formed at both ends of the conveyance guide 150 in the Y direction are on the same straight line. The slide projection 151 at the end portion of the conveyance guide 150 in the positive Y direction is pivotally supported by the rear frame 101B. The slide projection 151 at the end portion of the conveyance guide 150 in the positive Y direction is pivotally supported by the front frame 101A. Therefore, the conveyance guide 150 rotates about the rotation axis of the slide projection 151 with respect to the front frame 101A and the rear frame 101B.

The conveyance guide 150 has a vertical portion 150A and a horizontal portion 150B in the vicinity of the center portion interposed between the both ends in the Y direction. The vertical portion 150A and the horizontal portion 150B have a flat-plate shape extending in the Y direction and orthogonally intersect with each other. The cross section obtained when the portion in the vicinity of the center of the conveyance guide 150 is taken along the plane orthogonal to the Y direction has an L shape. With the conveyance guide 150 located at the guide position, the lower surface of the horizontal portion 150B abuts against the upper surface of the positioning plate 109. Therefore, when the horizontal portion 150B of the conveyance guide 150 abuts against the positioning plate 109, the rotation of the conveyance guide 150 is restricted, and the conveyance guide 150 is positioned at the guide position.

Figure 11:
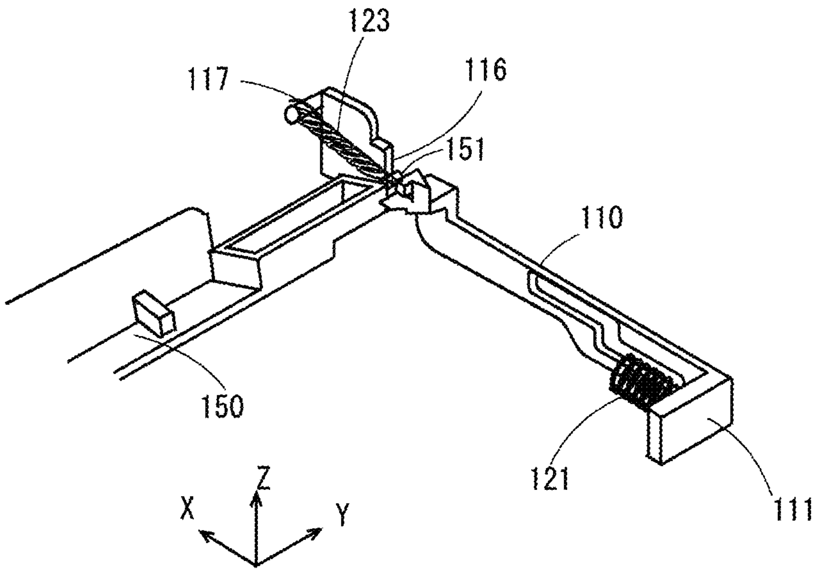
FIG. 11 is a diagram illustrating the slider and the conveyance guide being connected to each other.

FIG. 11 is a diagram illustrating the slider and the conveyance guide being connected to each other. The locking portion 117 of the slider 110 and the slide projection 151 of the conveyance guide 150 are connected by a tension spring 123. Further, one end of a compression spring 121 is connected to a surface of the slider 110 opposite to the pressed surface of the pressed plate 111 of the slider 110. The other end of the compression spring 121 is connected to the rear frame 101B.

Figure 12:
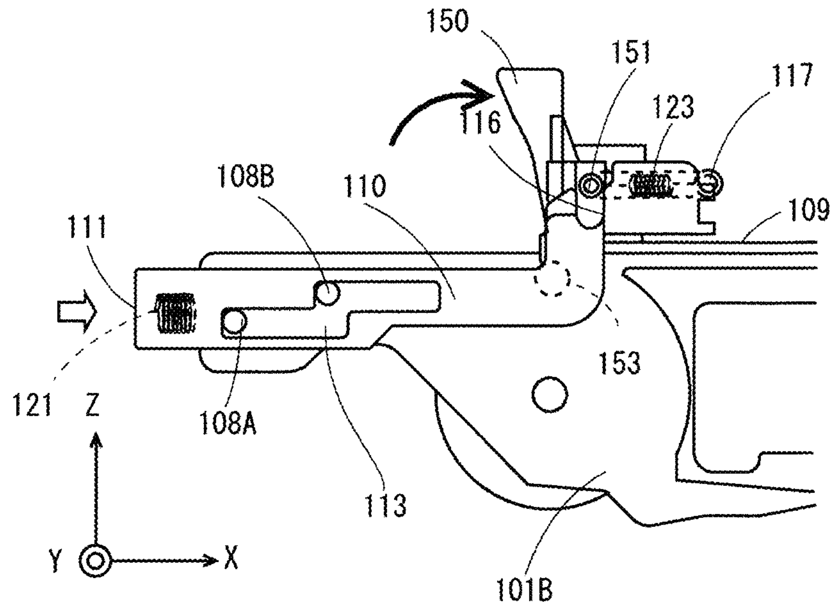
FIG. 12 is a diagram illustrating one example of the relative positional relationship between the conveyance guide located at a guide position and the slider.
Figure 13:
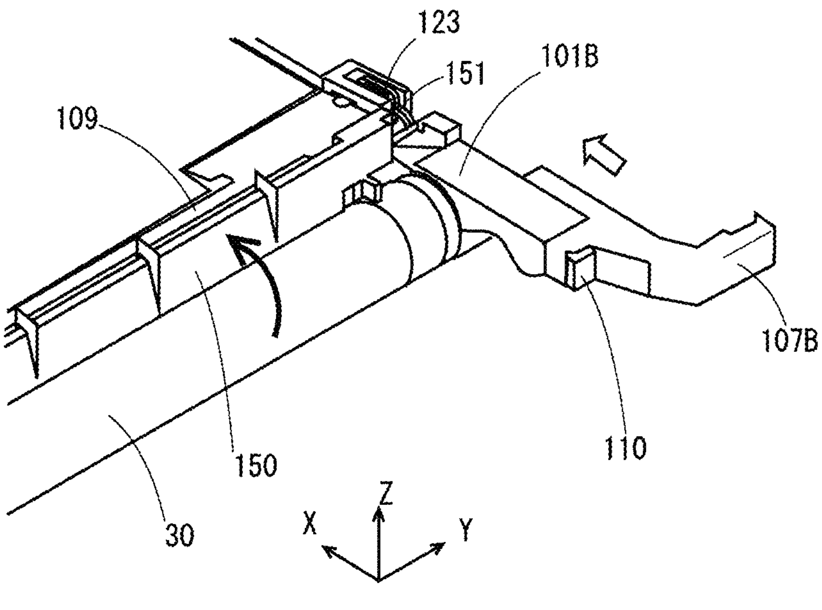
FIG. 13 is a perspective view illustrating the conveyance guide located at the guide position and the slider.

FIG. 12 is a diagram illustrating one example of the relative positional relationship between the conveyance guide located at a guide position and the slider. FIG. 13 is a perspective view illustrating the conveyance guide located at the guide position and the slider. With reference to FIGS. 12 and 13, in the rear frame 101B, a first guide pin 108A and a second guide pin 108B are provided at the surface opposite to the surface facing the front frame 101A. The first guide pin 108A and the second guide pin 108B are provided at a portion of the rear frame 101B overlapping with the rear handle 107B. The first guide pin 108A and the second guide pin 108B are arranged at the rear frame 101B to be spaced apart from each other by a predetermined distance in the X direction. The first guide pin 108A and the second guide pin 108B project in the direction parallel to the Y direction from the rear frame 101B. The first rear guide pin 103B and the second rear guide pin 105B are arranged to be spaced apart from each other by a predetermined distance in the X direction.

The slider 110 is attached to the rear frame 101B with the first guide pin 108A and the second guide pin 108B passing through the guide groove 113. Therefore, the slider 110 is restricted by the first guide pin 108A and the second guide pin 108B from moving in the Z direction and rotating in a plane orthogonal to the Y direction, and is movable in the X direction. The movement of the slider 110 in the X direction is limited in the range of the length of the guide groove 113 in the X direction. The farthest position at which the slider 110 is located in the positive X direction is referred to as a work position, and the farthest position at which the slider 110 is located in the negative X direction is referred to as an attachment-detachment position. The diagram illustrates the slider 110 being located at the work position.

As indicated by the outlined arrow, FIG. 12 illustrates the state in which the pressed plate 111 receives a force directed in the positive X direction, and the slider 110 moves in the positive X direction to be located at the attachment-detachment position. In this case, the compression spring 121 arranged between the pressed plate 111 and the rear frame 101B is compressed.

Here, with reference to FIG. 3, a pressing portion 19 is provided at a position corresponding to the slider 110 on the inner surface of the door 11 of the housing 10. With reference to FIGS. 3 and 12, the pressing portion 19 abuts against the pressed plate 111 of the slider 110 when the door 11 is closed, and the pressing portion 19 pushes the pressed plate 111 in the positive X direction. Thus, the slider 110 moves in the positive X direction and is located at the attachment-detachment position. Therefore, when the door 11 of the housing 10 is closed, the slider 110 moves in the positive X direction and is located at the work position.

The locking portion 117 of the slider 110 is connected to the slide projection 151 of the conveyance guide 150 via the tension spring 123. In the conveyance guide 150, two rotation shafts 153 respectively provided at both ends thereof are respectively and pivotally supported by the front frame 101A and the rear frame 101B. Therefore, the slide projection 151 receives a force in the positive X direction to rotate about the rotation shaft 153, and the conveyance guide 150 is positioned at the guide position. When the conveyance guide 150 is located at the guide position, the horizontal portion 150B of the conveyance guide 150 abuts against the positioning plate 109. In this state, it is preferable that the distance between the slide projection 151 and the locking portion 117 is larger than the length of the tension spring 123. The tension spring 123 extends by a predetermined length and applies a force to rotate the conveyance guide 150 in the clockwise direction indicated by the thick black arrow in FIG. 12. Therefore, the conveyance guide 150 can be reliably positioned.

Figure 14:
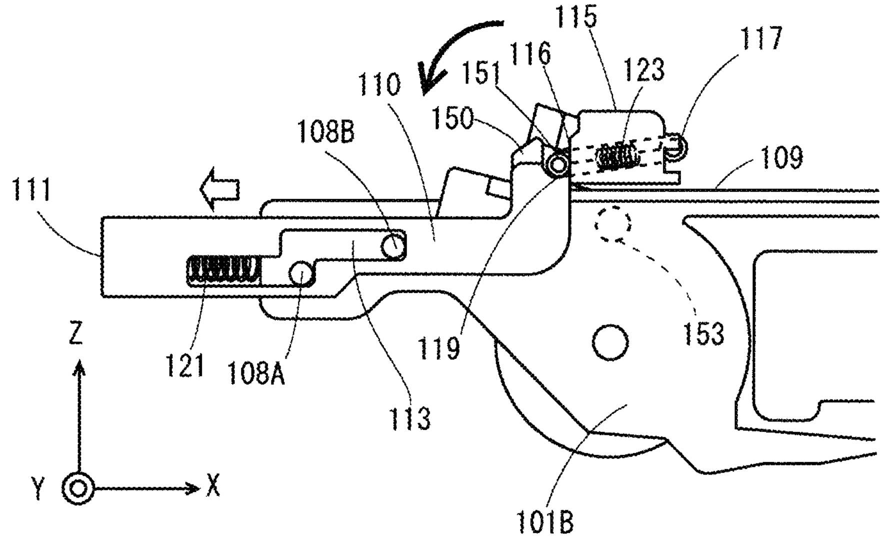
FIG. 14 is a diagram illustrating one example of the relative positional relationship between the conveyance guide located at a retracted position and the slider.
Figure 15:
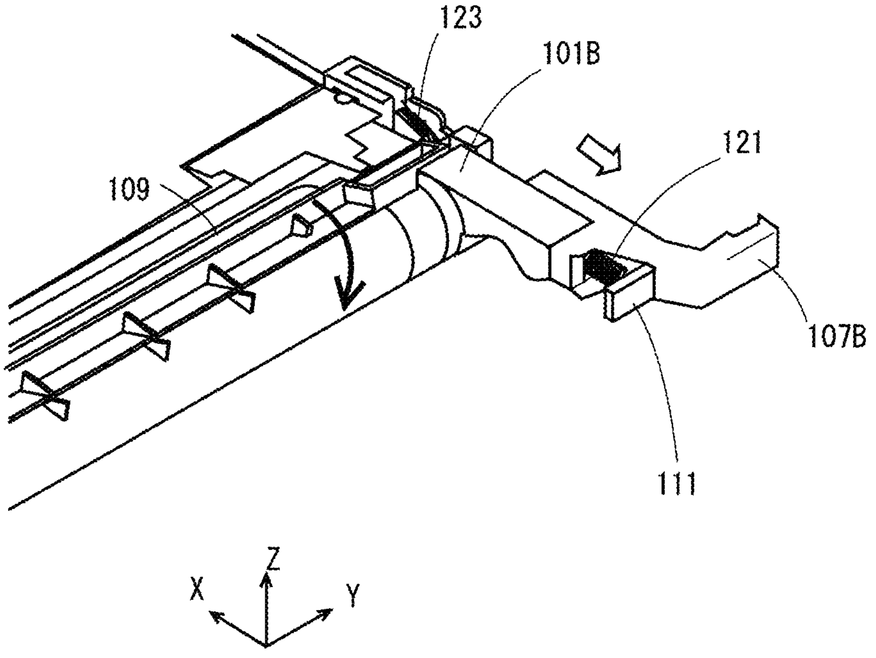
FIG. 15 is a perspective view illustrating the conveyance guide located at the retracted position and the slider.

FIG. 14 is a diagram illustrating one example of the relative positional relationship between the conveyance guide located at the retracted position and the slider. FIG. 15 is a perspective view illustrating the conveyance guide located at the retracted position and the slider. As indicated by the outlined arrow, FIGS. 14 and 15 illustrate the state in which the pressed plate 111 receives a force directed in the negative X direction from the compression spring 121 and the slider 110 has moved in the negative X direction. An elastic force of the compression spring 121 is larger than an elastic force of the tension spring 123.

With reference to FIGS. 3 and 12, when the door 11 is opened, the pressing portion 19 is separated from the pressed plate 111 of the slider 110. Thus, because the pressed plate 111 no longer receives a force from the pressing portion 19, the slider 110 moves to the attachment-detachment position in the positive X direction due to an elastic force of the compression spring 121. Therefore, when the door 11 of the housing 10 is opened, the slider 110 moves in the positive X direction and is located at the attachment-detachment position.

In a first movement period during which the slider 110 moves from the work position to the attachment-detachment position, the conveyance guide 150 moves from the guide position to the retracted position. During the first movement period, the guide plate 115 of the slider 110 pushes the slide projection 151 in the negative X direction. Thus, the conveyance guide 150 rotates in a counterclockwise direction, which is indicated by the thick black arrow in the diagram, about the rotation shaft 153. During the first movement period, the slide projection 151 slides along the guide surface 116 formed at the slide projection 151. The change that occurs during the movement period in regard to the relative positions of the slide projection 151 and the slider 110 is that the slide projection 151 moves from above to below along the guide surface 116 of the guide plate 115 and abuts against the engaging portion 119 connected to the guide surface 116. When the slide projection 151 abuts against the engaging portion 119, the conveyance guide 150 no longer rotates, and the slider 110 no longer moves. In a case in which the slider 110 is located at the attachment-detachment position, the slide projection 151 abuts against the engaging portion 119 and the conveyance guide 150 is located at the retracted position.

With reference to FIGS. 12 and 14, in a second movement period during which the slider 110 moves from the attachment-detachment position to the work position, the conveyance guide 150 moves from the retracted position to the guide position. Because the slider 110 moves in the positive X direction during the second movement period, the locking portion 117 moves in the positive X direction. When the distance between the locking portion 117 and the slide projection 151 becomes larger than the length of the tension spring 123, the slide projection 151 receives a force directed in the negative X direction. Thus, the conveyance guide 150 rotates about the rotation shaft 153 in the clockwise direction indicated by the thick black arrow in FIG. 12. When the horizontal portion 150B of the conveyance guide 150 abuts against the positioning plate 109, the conveyance guide 150 no longer rotates and is positioned at the guide position.

In the present embodiment, in a period during which moving between the guide position and the retracted position, the slide projection 151 is located farther upwardly than the rotation shaft 153. In other words, the slide projection 151 moves between the guide position and the retracted position in a range in which the slide projection 151 is located farther upwardly than the rotation shaft 153.

Second Embodiment

In the image forming apparatus 1 in the first embodiment, the transfer unit 100 has the slider 110. In an image forming apparatus 1 in the second embodiment, a transfer unit 100 includes a rotation lever 130 instead of the slider 110. The other configurations are the same as those of the image forming apparatus 1 in the first embodiment. Therefore, the image forming apparatus 1 in the second embodiment will be mainly described here in regard to the differences from the image forming apparatus 1 in the first embodiment.

Figure 16:
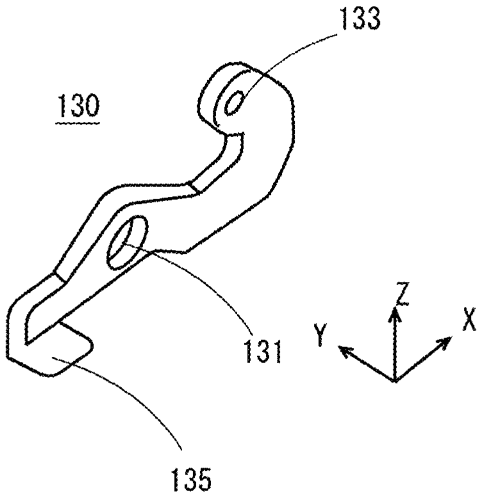
FIG. 16 is a perspective view of a rotation lever.

FIG. 16 is a perspective view of the rotation lever. With reference to FIG. 16, the rotation lever 130 includes a rotation bearing 131, and a first end portion and a second end portion that interpose the rotation bearing 131 therebetween. An abutment portion 135 is provided at the first end portion, and a locking portion 133 is provided at the second end portion. The rotation lever 130 has a flat-plate shape having both surfaces orthogonal to the Y direction. The rotation bearing 131 is an opening that penetrates the flat plate in the Y direction. The locking portion 133 is an opening that penetrates the flat plate in the Y direction. The abutment portion 135 is provided at the end portion opposite to the end portion in which the locking portion 133 is formed with reference to the rotation bearing 131. The abutment portion 135 has an abutment surface facing in the negative Z direction. The abutment portion 135 is formed by bending of a flat plate at a right angle.

Figure 17:
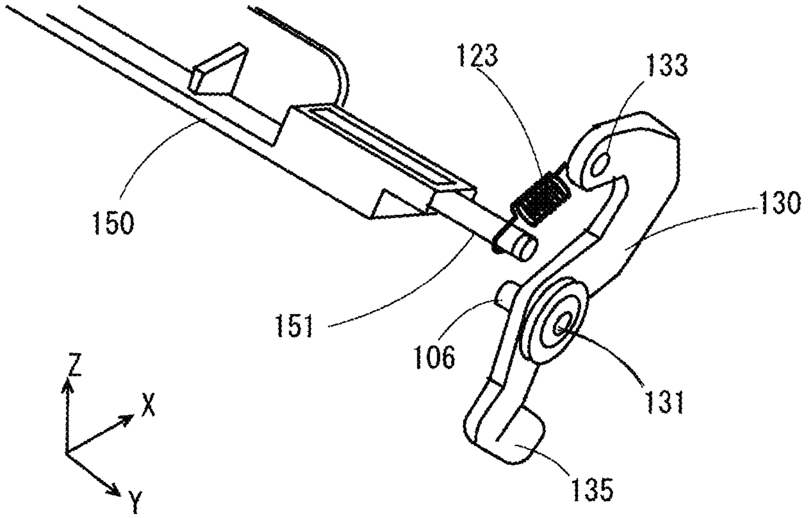
FIG. 17 is a diagram illustrating the rotation lever and the conveyance guide being connected to each other.

FIG. 17 is a diagram illustrating the rotation lever and a conveyance guide being connected to each other. The locking portion 133 of the rotation lever 130 and a slide projection 151 of the conveyance guide 150 are connected by a tension spring 123.

Figure 18:
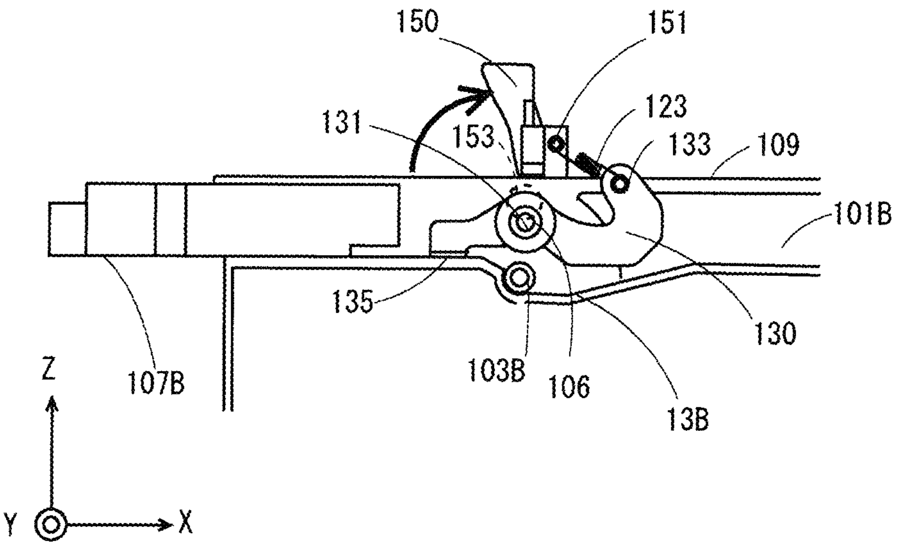
FIG. 18 is a diagram illustrating one example of the relative positional relationship between the conveyance guide located at the guide position and the rotation lever.

FIG. 18 is a diagram illustrating one example of the relative positional relationship between the conveyance guide located at the guide position and the rotation lever. With reference to FIG. 18, a lever rotation shaft 106 is provided at a rear frame 101B. The lever rotation shaft 106 projects from the rear frame 101B in a direction parallel to the Y direction. The lever rotation shaft 106 is provided farther upwardly than a first rear guide pin 103B.

The rotation lever 130 is attached to a rear frame 101B when the lever rotation shaft 106 is inserted into the rotation bearing 131 of the rotation lever 130. The rotation lever 130 is rotatable about the lever rotation shaft 106 while being attached to the rear frame 101B. The distance between the rotation shaft of the rotation bearing 131 of the rotation lever 130 and the abutment portion 135 is larger than the length of a restriction surface 17B in the Z direction.

The locking portion 133 of the rotation lever 130 is connected to the slide projection 151 of the conveyance guide 150 via the tension spring 123. The rotation shaft 153 of the conveyance guide 150 is pivotally supported by the rear frame 101B. The center of gravity of the conveyance guide 150 is located at a position farther negative than the lever rotation shaft 106 in the X direction with the conveyance guide 150 being located at the guide position.

When the user rotates the rotation lever 130 in the clockwise direction, the slide projection 151 receives a force directed in the positive X direction to rotate about the rotation shaft 153 and is positioned at the guide position. When the conveyance guide 150 is located at the guide position, a horizontal portion 150B of the conveyance guide 150 abuts against a positioning plate 109. In this state, it is preferable that the distance between the slide projection 151 and the locking portion 117 is larger than the length of the tension spring 123. The tension spring 123 extends by a predetermined length, and a force for rotating the conveyance guide 150 in the clockwise direction indicated by the thick black arrow in FIG. 18 is applied. Therefore, the conveyance guide 150 can be reliably positioned. The position of the rotation lever 130 illustrated in FIG. 18 is referred to as a work position.

Figure 19:
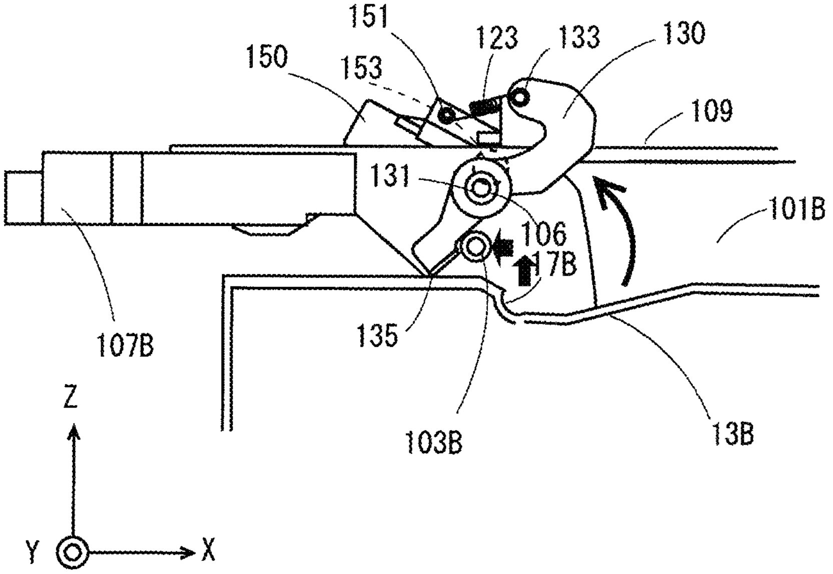
FIG. 19 is a diagram illustrating one example of the relative positional relationship between the conveyance guide located at the retracted position and the slider.

FIG. 19 is a diagram illustrating one example of the relative positional relationship between the conveyance guide located at the retracted position and the slider. With reference to FIG. 19, when the rotation lever 130 rotates from the work position in a direction in which the abutment portion 135 moves toward a first rear guide 13B, the rotation lever 130 rotates to an attachment-detachment position illustrated in FIG. 19. The center of gravity of the conveyance guide 150 is located at a position farther negative than the lever rotation shaft 106 in the X direction. Therefore, in a first movement period during which the rotation lever 130 moves from the work position to the attachment-detachment position, the conveyance guide 150 rotates about the rotation shaft 153 in the counterclockwise direction indicated by the thick black arrow in FIG. 17.

The locking portion 133 of the rotation lever 130 and the slide projection 151 of the conveyance guide 150 are connected by the tension spring 123. Therefore, when the rotation lever 130 stops at the attachment-detachment position, the conveyance guide 150 also stops.

Further, because the abutment portion 135 of the rotation lever 130 abuts against the first rear guide 13B, the point of contact between the abutment portion 135 and the first rear guide 13B served as a fulcrum, and the rotation bearing 131 serves as a point of load. Therefore, the rotation bearing 131 rotates about the point of contact between the abutment portion 135 and the first rear guide 13B. Because the point of contact between the abutment portion 135 and the first rear guide 13B is fixed, the rotation bearing 131 moves in a direction away from the first rear guide 13B. Therefore, the first rear guide 13B moves to a position above the restriction surface 17B.

An elastic member that biases the transfer unit 100 in the negative X direction is provided at the inner surface of the right sidewall of a housing 10. The first rear guide 13B moves to a position farther negative than the restriction surface 17B in the X direction. The positional relationship between the transfer unit 100 and the housing 10 at this stage is illustrated in FIG. 19.

With reference to FIG. 18 and FIG. 19, in a second movement period in which the rotation lever 130 moves from the attachment-detachment position to the work position, the conveyance guide 150 moves from a retracted position to the guide position. During the second movement period, because the rotation lever 130 rotates in the clockwise direction, the locking portion 117 moves in the positive X direction. When the distance between the locking portion 117 and the slide projection 151 becomes larger than the length of the tension spring 123, the slide projection 151 receives a force directed in the negative X direction. Thus, the conveyance guide 150 rotates about the rotation shaft 153 in the clockwise direction indicated by the thick black arrow in FIG. 18. When the horizontal portion 150B of the conveyance guide 150 abuts against the positioning plate 109, the conveyance guide 150 no longer rotates and is positioned at the guide position.

In the second embodiment, in a period during moving between the guide position and the retracted position, the slide projection 151 is located farther upwardly than the rotation shaft 153. In other words, the slide projection 151 moves between the guide position and the retracted position in a range in which the slide projection 151 is located farther upwardly than the rotation shaft 153.

Other Embodiments

In the image forming apparatus 1 in the first embodiment, the center of gravity of the conveyance guide 150 in the XY plane may be located at a position farther negative than the rotation shaft 153 in the X direction. In this case, because the conveyance guide 150 is rotated by gravity, the guide surface 116 does not have to be provided.

As described above, the image forming apparatus 1 in the present embodiment includes the conveyance guide 150 that is provided between the secondary transfer roller 26 and the fixing device 32 and guides a sheet to be conveyed from the secondary transfer roller 26 toward the fixing device 32. In a case in which the transfer unit 100 is attached to the housing 10 or in a case in which the transfer unit 100 is detached from the housing 10, the conveyance guide 150 can be retracted to the retracted position where the conveyance guide 102 does not interfere with the attachment or detachment of the transfer unit 100. Therefore, because work such as detachment of the conveyance guide 150 before attachment or detachment of the intermediate transfer unit 100 is not required, the transfer unit 100 can be easily attached or detached.

Further, the conveyance guide 150 retracts from the guide position to the retracted position before the transfer unit 100 moves from the receiving position to the separation position. Therefore, after the conveyance guide 150 is retracted to the retracted position, the transfer unit 100 can be moved from the receiving position to the separation position. Therefore, the transfer unit 100 can be attached or detached.

Further, the image forming apparatus 1 includes the first front guide 13A having the restriction surface 17A extending in the Z direction. The transfer unit 100 has the first front guide pin 103A for positioning the transfer unit 100. The first front guide pin 103A abuts against the restriction surface 17A with the transfer unit 100 being located below the fixing device 32 and above the photoreceptors 25Y, 25M, 25C, 25K and maintaining a predetermined distance from the photoreceptors 25Y, 25M, 25C, 25K. Thus, the transfer unit 100 is positioned in the X direction. Therefore, the position of the transfer unit 100 in the horizontal direction is defined by the restriction surface 17A. Further, because the movement of the first front guide pin 103A in the horizontal direction is no longer restricted with the first front guide pin 103A having moved to a position higher than the restriction surface 17A, it can facilitates the work for attaching or detaching the transfer unit 100.

Further, the conveyance guide 150 has the rotation shaft 153, and moves between the guide position and the retracted position by rotating about the rotation shaft 153. Therefore, it is possible to eliminate the work for detaching the conveyance guide 150 with a simple configuration.

Further, the rotation shaft 153 is pivotally supported by the transfer unit 100. Therefore, it is possible to improve accuracy in positioning the conveyance guide at the guide position.

Further, the conveyance guide 150 has the slide projection 151 extending in a direction parallel to the rotation shaft 153 at one end in a direction parallel to the rotation shaft 153, and the slide projection 151 is connected to the locking portion 117 by the tension spring 123. Therefore, because the slide projection 151 receives a force from the tension spring 123 in the positive X direction in accordance with the movement of the slider 110 in the positive X direction, the conveyance guide 150 can be moved from the retracted position to the guide position. Further, the slider 110 has the guide surface 116 that faces in the negative X direction and abuts against the slide projection 151. Further, because the guide surface 116 moves in the negative X direction in accordance with movement of the slider in the negative X direction, the guide surface 116 pushes the slide projection 151 in the negative X direction. Therefore, the conveyance guide 150 can be moved from the guide position to the retracted position.

Further, the compression spring 121 which biases the slider 110 in the negative X direction is further provided. The slider 110 has the pressed plate 111 at the end portion in the negative X direction, and the door 11 of the housing 10 has the pressing portion 19 that abuts against the pressed plate 111 in the close state at the inner surface facing the inner space. Because the pressed plate 111 no longer abuts against the pressing portion 19 in accordance with the change of the door 11 from the close state to the open state, the slider 110 moves in the negative X direction due to the effect of the compression spring 121. Further, because the pressing portion 19 presses the pressed plate 111 in the positive X direction in accordance with the change of the door 11 from the open state to the close state, the slider 110 moves in the positive X direction. Therefore, the slider 110 can be moved in the X direction in accordance with opening and closing of the door 11 of the housing 10.

Further, the slider 110 is provided in the transfer unit 100. Therefore, the slider 110 can be accurately positioned with respect to the transfer unit 100, and the slider 110 can be accurately positioned with respect to the conveyance guide 150.

Further, in a plane orthogonal to the rotation shaft 153, the conveyance guide 150 rotates in a rotation range in which the center of gravity of the conveyance guide 150 does not overlap with the rotation shaft 153 in the upward-and-downward direction. The conveyance guide 150 has, at one end in a direction parallel to the rotation shaft 153, the slide projection 151 that extends in a direction parallel to the rotation shaft 153. In regard to the conveyance guide 150, in the plane (XY plane) orthogonal to the rotation shaft 153, the center of gravity is located to be separated from the rotation shaft 153 in the negative X direction, and the slider 110 has the locking portion 117 connected to the slide projection 151. Therefore, the slide projection 151 moves together with the locking portion 117 in accordance with the movement of the slider 110 in the positive X direction. Therefore, the conveyance guide 150 can be moved from the retracted position to the guide position. Further, the slide projection 151 moves together with the locking portion 117 in accordance with the movement of the slider 110 in the negative X direction. In regard to the conveyance guide 150, because the center of gravity is located to be separated from the rotation shaft 153 in the negative X direction, the slide projection 151 moves in the negative X direction. Therefore, the conveyance guide 150 can be moved from the guide position to the retracted position.

Further, in the image forming apparatus 1 in the second embodiment, the distance between the abutment portion 135 of the rotation lever 130 and the rotation bearing 131 is larger than the distance between the rotation bearing 131 and the first rear guide pin 103B with the transfer unit 100 being attached to the housing 10. Therefore, with the rotation lever 130 being located at the attachment-detachment position, the first rear guide pin 103B can be located above the restriction surface 17B. Further, with the rotation lever 130 being located at the work position, the first rear guide pin 103B can abut against the restriction surface 17B. Therefore, it facilitates attachment or detachment of the transfer unit 100.

Overview of Embodiment (Item 1) An image forming apparatus includes a photoreceptor that bears a toner image, an intermediate transfer unit that receives the toner image from the photoreceptor and bears the toner image, a transfer section that transfers the toner image borne by the intermediate transfer unit to a recording medium, a fixing section that fixes the toner image to the recording medium, and a conveyance guide that is provided between the transfer section and the fixing section, and guides the recording medium to be conveyed from the transfer section toward the fixing section, wherein the intermediate transfer unit is attachable to and detachable from an apparatus body, and during attachment or detachment of the intermediate transfer unit, the conveyance guide is retractable to a retracted position where the conveyance guide does not interfere with attachment or detachment of the intermediate transfer unit.

According to this aspect, the conveyance guide provided between the transfer section that transfers a toner image borne by the intermediate transfer unit and the fixing section can be retracted to the retracted position at which the conveyance guide does not interfere with attachment or detachment of the intermediate transfer unit when the intermediate transfer unit is attached or detached. Therefore, it is not necessary to detach the conveyance guide before attachment or detachment of the intermediate transfer unit, so that it is possible to provide the image forming apparatus that can easily attach or detach the intermediate transfer unit.

(Item 2) The image forming apparatus according to item 1, wherein the intermediate transfer unit moves from a receiving position where the intermediate transfer unit receives the toner image from the photoreceptor to a separation position that is separated from the photoreceptor, and then is attached to or detached from the apparatus body, and before the intermediate transfer unit moves from the receiving position to the separation position, the conveyance guide retracts from a guide position for guiding the recording medium to the retracted position.

According to this aspect, the conveyance guide retracts from the guide position to the retracted position before the intermediate transfer unit moves from the receiving position to the separation position. Therefore, after the conveyance guide retracts to the retracted position, the intermediate transfer unit can be moved from the receiving position to the separation position. Therefore, the intermediate transfer unit can be attached or detached.

(Item 3) The image forming apparatus according to item 2, further includes a positioner that has a restriction surface extending in an upward-and-downward direction, wherein the intermediate transfer unit has a convex portion that abuts against the restriction surface with the position of the intermediate transfer unit in the upward-and-downward direction being defined.

According to this aspect, in regard to the intermediate transfer unit that comes into contact with the photoreceptor below the fixing section and above the photoreceptor, its convex portion abuts against the restriction surface with the position of the intermediate transfer unit in the upward-and-downward direction being defined. Therefore, the position of the intermediate transfer unit in the horizontal direction is defined by the positioner. Further, because the horizontal movement of the convex portion is not restricted with the convex portion being moved farther upwardly than the positioner, it can facilitate attachment or detachment of the intermediate transfer unit.

(Item 4) The image forming apparatus according to item 2 or 3, wherein the conveyance guide has a rotation shaft, and moves between the guide position and the retracted position by rotating about the rotation shaft.

According to this aspect, the conveyance guide moves between the guide position and the retracted position by rotating about the rotation shaft. Therefore, it is possible to eliminate the work for detaching the conveyance guide with a simple configuration.

(Item 5) The image forming apparatus according to item 3, wherein the rotation shaft is pivotally supported by the intermediate transfer unit.

Therefore, it is possible to improve accuracy in positioning the conveyance guide at the guide position.

(Item 6) The image forming apparatus according to item 4 or 5, wherein the conveyance guide rotates in a rotation range in which a center of gravity does not overlap with the rotation shaft in an upward-and-downward direction in a plane orthogonal to the rotation shaft.

According to this aspect, because the center of gravity of the conveyance guide does not overlap with the rotation shaft in the upward-and-downward direction, the conveyance guide can be rotated by application of a force in one direction to the conveyance guide.

(Item 7) The image forming apparatus according to any one of items 4 to 6, wherein the conveyance guide has a slide projection that extends in a direction parallel to the rotation shaft, and further includes a slider that is directly or indirectly connected to the slide projection and is attached to be movable in one direction in a plane intersecting with the rotation shaft.

According to this aspect, the conveyance guide can be rotated in accordance with the movement of the slider in the one direction. Because it is possible to move the slide projection in the first direction by moving the slider in the first direction, the conveyance guide can be moved from the retracted position to the guide position. Further, because it is possible to move the slide projection in the second direction by moving the slider in the second direction opposite to the first direction, the conveyance guide can be moved from the guide position to the retracted position.

(Item 8) The image forming apparatus according to item 7, wherein the slider has an engaging portion connected to the slide projection via a first elastic member, and a guide surface that is arranged between the slide projection and the engaging portion in the one direction and faces in a second direction opposite to the first direction directed toward the engaging portion.

According to this aspect, as the slider moves in the first direction, the engaging portion moves in the first direction. Because the slide projection is connected to the engaging portion via the first elastic member, the slide projection moves in the first direction together as the engaging portion moves in the first direction. Therefore, the conveyance guide can be moved from the retracted position to the guide position. Further, because the guide surface moves in the second direction as the slider moves in the second direction, the guide surface facing in the second direction pushes the slide projection in the second direction. As a result, the slide projection moves in the second direction. Therefore, the conveyance guide can be moved from the guide position to the retracted position.

(Item 9) The image forming apparatus according to item 7 or 8, wherein the slider is provided in the intermediate transfer unit.

According to this aspect, because being provided in the intermediate transfer unit, the slider can be accurately positioned with respect to the intermediate transfer unit and the slider can be accurately positioned with respect to the conveyance guide.

(Item 10) The image forming apparatus according to any one of items 7 to 9, further includes a housing having an inner space in which the photoreceptor, the intermediate transfer unit, the transfer section, the fixing section and the conveyance guide are accommodated, and a second elastic member that biases the slider in a first direction parallel to the one direction, wherein the slider has a pressed portion at an end portion in the first direction, the housing includes a door that is openable in an open state in which at least part of the inner space is opened outwardly, and is closable in a close state in which the inner space is not opened outwardly, and the door has, in a surface facing the inner space, a pressing member that abuts against the pressed portion in the close state.

According to this aspect, as the door changes from the close state to the open state, the pressed portion no longer abuts against the pressing member. Therefore, the slider moves in the first direction. Further, as the door changes from the open state to the close state, the pressing member presses the pressed portion in the second direction. Therefore, the slider moves in the second direction. Therefore, the slider can be moved in the one direction as the door is opened and closed.

(Item 11) The image forming apparatus according to any one of items 4 to 6, further includes a positioner that has a restriction surface extending in an upward-and-downward direction, and a rotation lever that is attached to the intermediate transfer unit so as to be rotatable about a lever rotation shaft projecting from a side surface of the intermediate transfer unit, and has a first end portion and a second end portion between which the lever rotation shaft is interposed, wherein the intermediate transfer unit has a convex portion that abuts against the restriction surface with a position of the intermediate transfer unit in the upward-and-downward direction being defined, the convex portion is arranged farther downwardly than the lever rotation shaft, a distance between the first end portion and the lever rotation shaft is larger than a length of the restriction surface in the upward-and-downward direction, and the second end portion is connected to the conveyance guide.

According to this aspect, because the convex portion is arranged below the lever rotation shaft, the intermediate transfer unit can be positioned by causing the convex portion to abut against the restriction surface. Further, because the distance between the first end portion and the lever rotation shaft is larger than the length of the restriction surface in the upward-and-downward direction, it is possible to move the convex portion to a position farther upward than positioner. Therefore, the intermediate transfer unit is attachable and detachable. Further, the second end portion is connected to the conveyance guide. Therefore, because the conveyance guide can be rotated in the first rotation direction by movement of the rotation lever in the first rotation direction, the conveyance guide can be moved from the retracted position to the guide position. Further, because the conveyance guide can be rotated in the second rotation direction by movement of the rotation lever in the second rotation direction opposite to the first rotation direction, the conveyance guide can be moved from the guide position to the retracted position.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:

a photoreceptor that bears a toner image;

an intermediate transfer unit that receives the toner image from the photoreceptor and bears the toner image;

a transfer section that transfers the toner image borne by the intermediate transfer unit to a recording medium;

a fixing section that fixes the toner image to the recording medium; and a conveyance guide that is provided between the transfer section and the fixing section, and guides the recording medium to be conveyed from the transfer section toward the fixing section, wherein the intermediate transfer unit is attachable to and detachable from an apparatus body, the conveyance guide is fixed to the intermediate transfer unit, and during attachment or detachment of the intermediate transfer unit, the conveyance guide is retractable to a retracted position where the conveyance guide does not interfere with attachment or detachment of the intermediate transfer unit.

2. The image forming apparatus according to claim 1, wherein the intermediate transfer unit moves from a receiving position where the intermediate transfer unit receives the toner image from the photoreceptor to a separation position that is separated from the photoreceptor, and then is attached to or detached from the apparatus body, and before the intermediate transfer unit moves from the receiving position to the separation position, the conveyance guide retracts from a guide position for guiding the recording medium to the retracted position.

3. The image forming apparatus according to claim 2, further comprising a front guide that has a restriction surface extending in an upward-and-downward direction, wherein the intermediate transfer unit has a guide pin that abuts against the restriction surface with the position of the intermediate transfer unit in the upward-and-downward direction being defined.

4. The image forming apparatus according to claim 2, wherein the conveyance guide has a rotation shaft, and moves between the guide position and the retracted position by rotating about the rotation shaft.

5. The image forming apparatus according to claim 4, wherein the rotation shaft is pivotally supported by the intermediate transfer unit.

6. The image forming apparatus according to claim 4, wherein the conveyance guide rotates in a rotation range in which a center of gravity does not overlap with the rotation shaft in an upward-and-downward direction in a plane orthogonal to the rotation shaft.

7. The image forming apparatus according to claim 4, wherein the conveyance guide has a slide projection that extends in a direction parallel to the rotation shaft, and further includes a slider that is directly or indirectly connected to the slide projection and is attached to be movable in one direction in a plane intersecting with the rotation shaft.

8. The image forming apparatus according to claim 7, wherein the slider has an engaging portion connected to the slide projection via a first elastic member, and a guide surface that is arranged between the slide projection and the engaging portion in the one direction and faces in a second direction opposite to the first direction directed toward the engaging portion.

9. The image forming apparatus according to claim 7, wherein the slider is provided in the intermediate transfer unit.

10. The image forming apparatus according to claim 7, further comprising:

a housing having an inner space in which the photoreceptor, the intermediate transfer unit, the transfer section, the fixing section and the conveyance guide are accommodated; and a second elastic member that biases the slider in a first direction parallel to the one direction, wherein the slider has a pressed portion at an end portion in the first direction, the housing includes a door that is openable in an open state in which at least part of the inner space is opened outwardly, and is closable in a close state in which the inner space is not opened outwardly, and the door has, in a surface facing the inner space, a pressing member that abuts against the pressed portion in the close state.

11. The image forming apparatus according to claim 4, further comprising:

a front guide that has a restriction surface extending in an upward-and-downward direction; and a rotation lever that is attached to the intermediate transfer unit so as to be rotatable about a lever rotation shaft projecting from a side surface of the intermediate transfer unit, and has a first end portion and a second end portion between which the lever rotation shaft is interposed, wherein the intermediate transfer unit has a guide pin that abuts against the restriction surface with a position of the intermediate transfer unit in the upward-and-downward direction being defined, the guide pin is arranged farther downwardly than the lever rotation shaft, a distance between the first end portion and the lever rotation shaft is larger than a length of the restriction surface in the upward-and-downward direction, and the second end portion is connected to the conveyance guide.

* * * * *